United States Patent
Patnaik et al.

(10) Patent No.: US 10,176,064 B2
(45) Date of Patent: Jan. 8, 2019

(54) GRANULAR CONSISTENCY GROUP REPLICATION

(71) Applicant: NetApp Inc., Sunnyvale, CA (US)

(72) Inventors: Pranab Patnaik, Cary, NC (US);
Rajesh Desai, Sunnyvale, CA (US);
Kai Tan, Cary, NC (US)

(73) Assignee: NetApp Inc., Sunnyvale, CA (US)

( * ) Notice: Subject to any disclaimer, the term of this patent is extended or adjusted under 35 U.S.C. 154(b) by 102 days.

(21) Appl. No.: 15/054,513

(22) Filed: Feb. 26, 2016

(65) Prior Publication Data
US 2017/0249222 A1    Aug. 31, 2017

(51) Int. Cl.
G06F 11/20    (2006.01)
G06F 3/06    (2006.01)
G06F 11/14    (2006.01)

(52) U.S. Cl.
CPC .......... *G06F 11/2058* (2013.01); *G06F 3/065* (2013.01); *G06F 3/0619* (2013.01); *G06F 3/0665* (2013.01); *G06F 3/0689* (2013.01); *G06F 11/1446* (2013.01); *G06F 11/1451* (2013.01); *G06F 11/1464* (2013.01); *G06F 11/2064* (2013.01); *G06F 11/2071* (2013.01); *G06F 11/2082* (2013.01); *G06F 2201/84* (2013.01)

(58) Field of Classification Search
CPC ............. G06F 11/1458; G06F 11/1446; G06F 11/2058; G06F 11/2064; G06F 11/2071; G06F 11/2074; G06F 11/2079; G06F 11/1484; G06F 11/2097; G06F 11/2029; G06F 11/2038; G06F 17/30085; G06F 17/30162; G06F 17/30212; G06F 2212/1032
See application file for complete search history.

(56) References Cited

U.S. PATENT DOCUMENTS 6,510,500 B2 * 1/2003 Sarkar ................ G06F 11/2069
707/999.202
7,308,545 B1 * 12/2007 Kekre ................ G06F 11/2097
707/999.202
(Continued)

OTHER PUBLICATIONS

Int. Search Report/Written Opinion cited in PCT Application No. PCT/US2017/018788 dated Jul. 13, 2017, 22 pgs.

*Primary Examiner* — Nadeem Iqbal
(74) *Attorney, Agent, or Firm* — Cooper Legal Group, LLC

(57) ABSTRACT

One or more techniques and/or computing devices are provided for granular replication for data protection. For example, a first storage controller may host a first volume. A consistency group, comprising a subset of files, logical unit numbers, and/or other data of the first volume, is defined through a consistency group configuration. A baseline transfer, using a baseline snapshot of the first volume, is used to create a replicated consistency group within a second volume hosted by a second storage controller. In this way, an arbitrary level of granularity is used to synchronize/replicate a subset of the first volume to the second volume. If a synchronous replication relationship is specified, then one or more incremental transfer are performed and a synchronous replication engine is implemented. If an asynchronous replication relationship is specified, then snapshots are used to identify delta data of the consistency group for updating the replication consistency group.

20 Claims, 13 Drawing Sheets

(56) References Cited

U.S. PATENT DOCUMENTS

| | | | |
|---|---|---|---|
| 7,454,583 B2* | 11/2008 | Yagisawa | G06F 11/1435 711/162 |
| 8,001,346 B2* | 8/2011 | Colgrove | G06F 11/2064 707/639 |
| 8,806,161 B1* | 8/2014 | Natanzon | G06F 3/065 707/655 |
| 2012/0042139 A1 | 2/2012 | Coronado et al. | |
| 2012/0151164 A1* | 6/2012 | Nayak | G06F 11/2094 711/162 |
| 2013/0103650 A1* | 4/2013 | Natanzon | G06F 17/30008 707/684 |
| 2014/0149698 A1 | 5/2014 | Ezra et al. | |
| 2015/0186488 A1 | 7/2015 | Fischer et al. | |

* cited by examiner

GRANULAR CONSISTENCY GROUP REPLICATION

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data is provided using a synchronous replicated copy of a primary storage object. The high availability to data may be provided through a software defined architecture, using synchronous replication, and is not limited to merely two storage controllers.

Various replication and synchronization techniques may be used to replicate data (e.g., client data), configuration data (e.g., a size of a volume, a name of a volume, logical unit number (LUN) configuration data, etc.), and/or write caching data (e.g., cached write operations not yet flushed to a storage device, but cached within memory such as a non-volatile random access memory (NVRAM)) between storage controllers and/or storage devices. In an example of synchronization, a synchronous replication relationship may be implemented between the first storage controller and the second storage controller, such that an incoming write operation to the first storage controller is locally implemented upon a first storage object (e.g., a file, a LUN, a LUN spanning multiple volumes, or any other type of object) by the first storage controller and remotely implemented upon a second storage object (e.g., maintained as a fully synchronized copy of the first storage object) by the second storage controller before an acknowledgement is provided back to a client that sent the incoming write operation. In another example, asynchronous replication may be achieved by capturing snapshots of a volume, determining data differences (e.g., deltas) between a current snapshot and a last snapshot used to replicate data to the second storage object, and using incremental transfers to send the data differences to the second storage controller for implementation upon the second storage object.

In many deployment scenarios (e.g., with server virtualization where storage for multiple virtual machines are provisioned on the same volume to take advantage of storage efficiency gains attained via deduplication), a client may have an interest in replicating merely a portion of a volume, such as a subdirectory, one or more files, one or more LUNs, a storage object, a set of storage objects, or any other arbitrary portion of the volume, and thus volume level replication techniques may waste computing resources and bandwidth by replicating the entire volume such as data with which the client does not have an interest in replicating (e.g., a test directory, a temporary directory, a test storage virtual machine, etc.). Such inefficiencies become even more problematic as the size of volumes increase.

DETAILED DESCRIPTION

Figure 1:
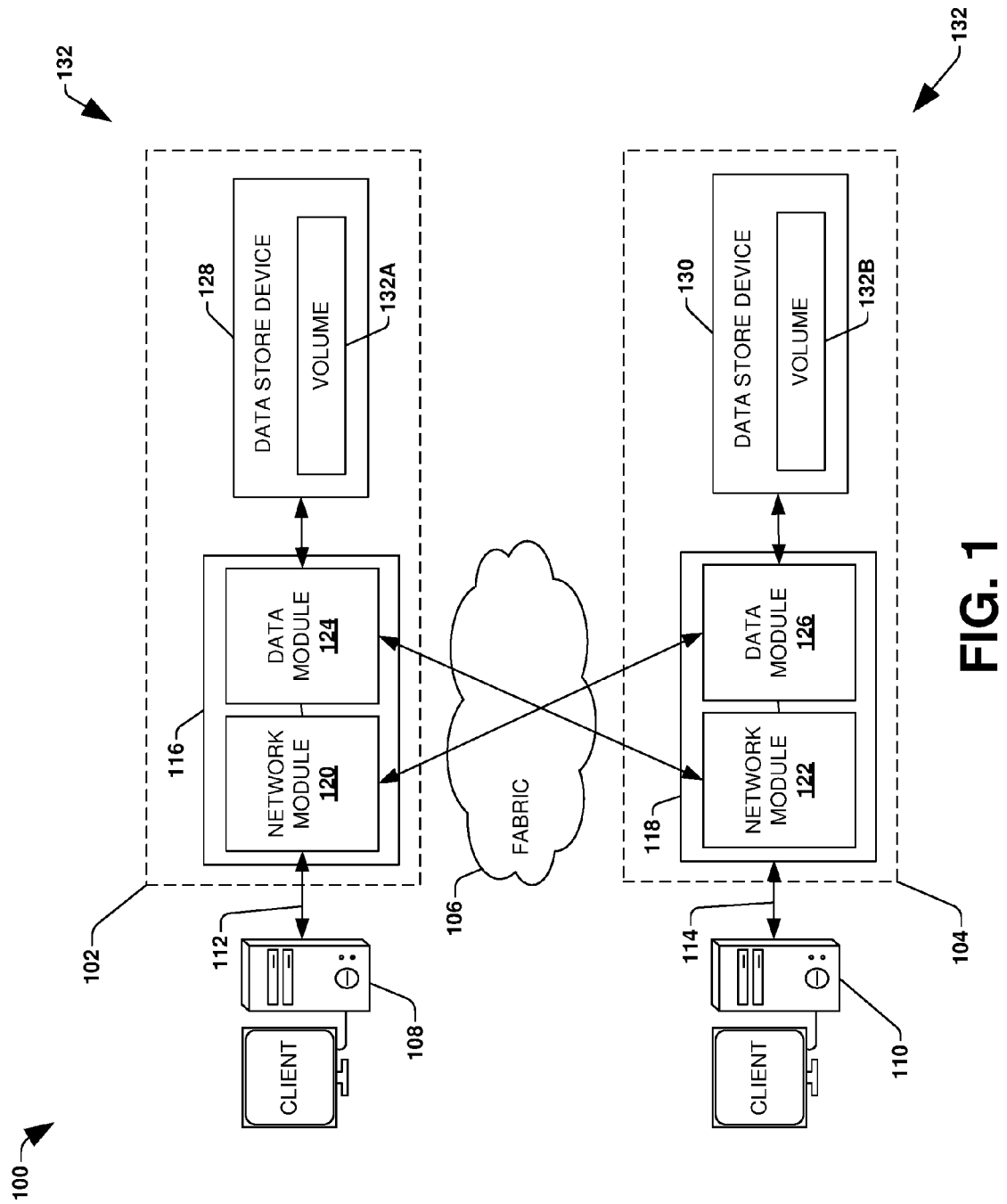
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for granular replication for data protection, such as backup/restore, disaster recovery, and/or data migration, are provided herein. For example, a client may have an interest in replicating a set of files or LUNs (e.g., a subset of files or LUNs within a volume, within one or more directories of the volume, spanning multiple volumes, or spanning storage of multiple storage controllers) for data protection, such as for disaster or failover recovery purposes (e.g., the enablement of data protection for financial and engineering data of a company). In an example, multiple storage virtual machines may be efficiently provisioned within a first volume hosted by a first storage controller because virtual machine disks, such as vmdk files, may be rapidly cloned while preserving storage efficiency such as deduplication within the first volume. However, merely a subset of the virtual machines and/or virtual machine disks may comprise data for which the client wants to enable data protection with a particular recovery point objective (RPO), such as zero or near zero RPO. Volume level replication and/or other non-arbitrary levels of replication may replicate data that the client does not have an interest in replicating (e.g., a temporary directory, testing data, a test virtual machine and virtual disk, etc.), thus wasting computing resources and network bandwidth. Accordingly, as provided herein, an arbitrary level of granularity for replicating data within a defined arbitrary group, while continuing to preserve dependent write order consistency within the defined arbitrary group, may be provided. For example, a file, a set of files, a logical unit number (LUN), a set of LUNs, a subdirectory, a storage object, and/or any other arbitrary grouping of data may be defined for synchronous or asynchronous replication from the first volume, hosted by the first storage controller, and a second volume hosted by a second storage controller. In this way, computing resources and bandwidth are conserved by merely replicating data of interest, such as a granular consistency group comprising one or more files and/or one or more LUNs.

To provide context for granular replication for data protection, FIG. 1 illustrates an embodiment of a clustered network environment 100 or a network storage environment. It may be appreciated, however, that the techniques, etc. described herein may be implemented within the clustered network environment 100, a non-cluster network environment 100, and/or a variety of other computing environments, such as a desktop/server computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that granular replication for data protection may be implemented within the clustered network environment 100. In an example, a consistency group, comprising a subset of data within the volume 132A of node 116 (e.g., a first storage controller) such as one or more files and/or LUNs, may be defined through a consistency group relationship (e.g., a one-step process of defining the consistency group and establishing data protection may be implemented, where the creation of the consistency group relationship for replication includes the identification of files and/or LUNs for inclusion within a consistency group; the consistency group may be established first, and data protection may be defined later; etc.). The consistency group relationship may be used to facilitate synchronous replication (e.g., with a synchronous recovery point objective (RPO), asynchronous replication (e.g., within an asynchronous RPO), or continuous replication (e.g., with a near-zero (RPO)) between the volume 132A of node 116 and the volume 132B of node 118 (e.g., a second storage controller). It may be appreciated that granular replication for data protection may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
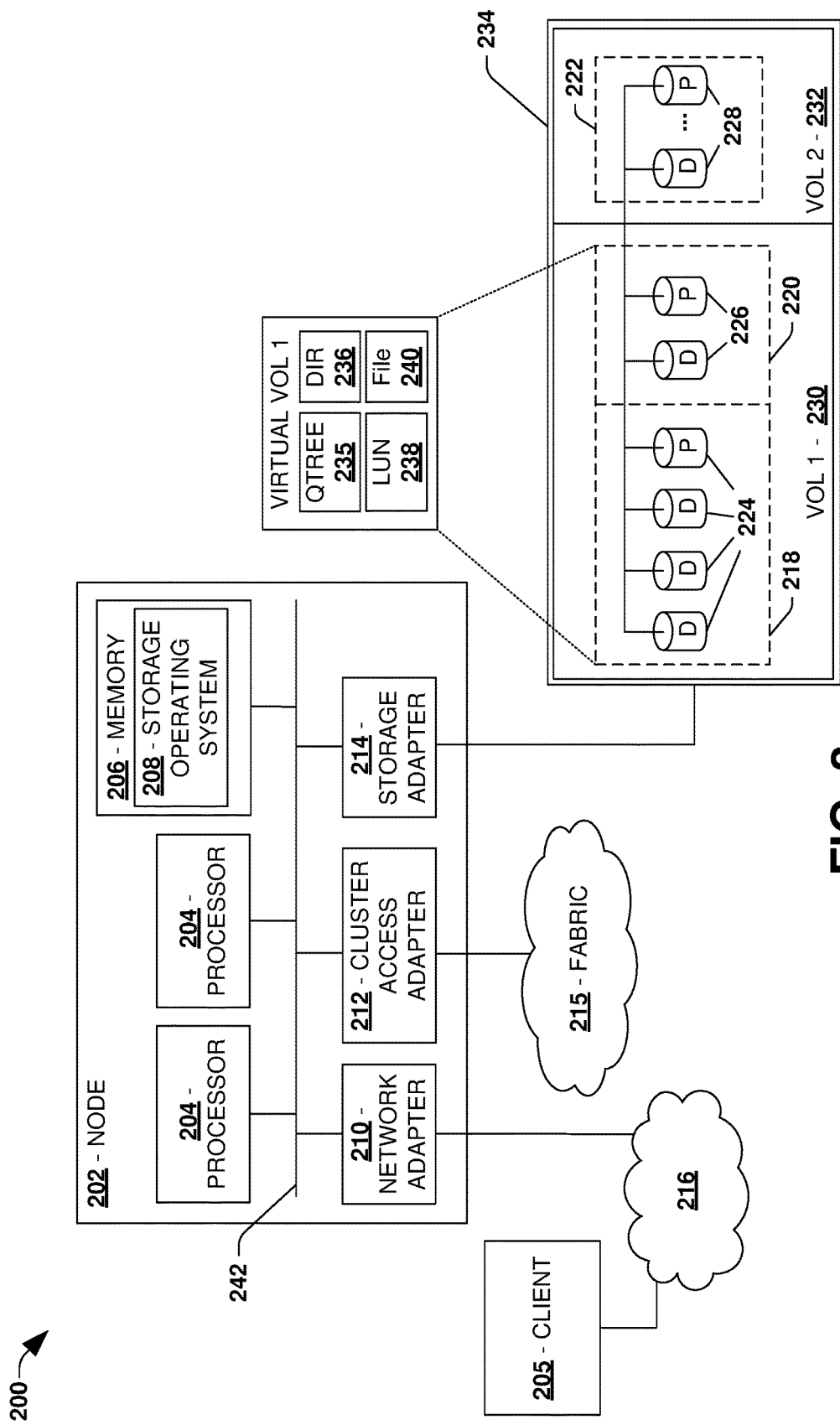
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that granular replication for data protection may be implemented for the data storage system 200. In an example, a consistency group, comprising a subset of data within the volume 230 of node 202 (e.g., a first storage controller) such as one or more files and/or LUNs, may be defined through a consistency group relationship (e.g., a one-step process of defining the consistency group and establishing data protection may be implemented, where the creation of the consistency group relationship for replication includes the identification of files and/or LUNs for inclusion within a consistency group; the consistency group may be established first, and data protection may be defined later; etc.). The consistency group relationship may be used to facilitate synchronous replication (e.g., with a synchronous recovery point objective (RPO), asynchronous replication (e.g., within an asynchronous RPO), or continuous replication (e.g., with a near-zero (RPO)) between the volume 230 of node 202 and a second volume of a second node (e.g., a second storage controller). It may be appreciated that granular replication for data protection may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
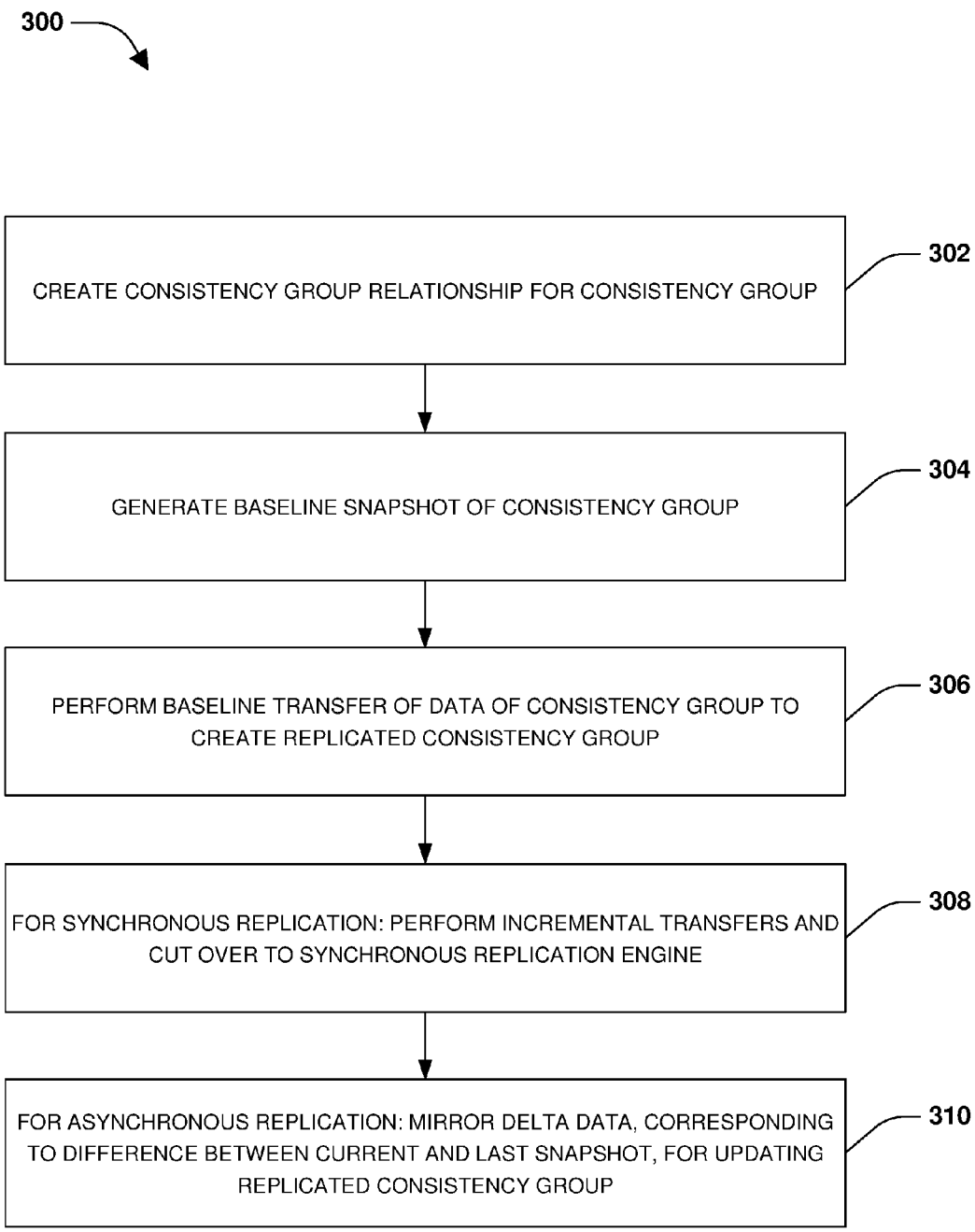
FIG. 3 is a flow chart illustrating an exemplary method of granular replication for data protection.

One embodiment of granular replication for data protection is illustrated by an exemplary method 300 of FIG. 3. For example, a first storage controller may host a first volume and/or other volumes within which a client may store data, such as engineering data, testing data, accounting data, temporary data, etc. A second storage controller (e.g., hosted within the same storage site as the first storage controller or hosted within a remote storage site such as a different building, city, or location than the first storage controller) may be configured to as a disaster recovery partner for the first storage controller, such that if the first storage controller fails, then the second storage controller may provide clients with failover access to replicated data (e.g., data replicated from the first volume to a backup volume that can be taken over by the second storage controller) previously accessible through the failed first storage controller. Because the client may have an interest in providing data protection at a desired recovery point objective (RPO) for merely a subset of data (e.g., data protection for the engineering and accounting data, but not the testing and temporary data, within a volume, stored across multiple volumes, or stored within storage hosted by multiple storage controllers), volume level replication may waste significant amounts of resources and bandwidth by replicating data with which the client does not a desire to protect.

Accordingly, a consistency group relationship, for a consistency group comprising a subset of the first volume, may be created, at 302. The consistency group may comprise one or more files, LUNs, directories, and/or objects of the first volume (e.g., files and/or LUNs comprising storage virtual machines, applications, and/or virtual machine disks used to host and store the engineering and accounting data). The consistency group may be a granular consistency group because the consistency group may be defined at a file or LUN level of granularity. In an example, a user interface, populated with information regarding files and LUNs within the first volume, may be provided, such as displayed to a client or storage administrator. A user input, specifying one or more files and/or LUNs as the subset of the first volume, may be received through the user interface. In this way, the consistency group may be identified. In an example, the user interface may provide a mapping of files/LUNs within the first volume to corresponding replicated files/LUNs within a second volume (e.g., a client can specify that a LUN-1 and a LUN-2 in the first volume will constitute a consistency group, and that LUN-1 will map to a LUN-A in the second volume and LUN-2 will map to a LUN-B in the second volume). In an example, the user interface enables dynamic modification of the consistency group even while a data protection relationship is in effect.

Universal unique identifiers (UUIDs) may be assigned to files and/or LUNs within the subset of the first volume. The UUIDs may be specified within the consistency group configuration so that the first storage controller, the second storage controller, and/or other disaster recovery partner storage controllers can identify, using the consistency group configuration, files and/or LUNs of the consistency group for replication and data protection. In an example, the consistency group configuration may be stored within a metadata file (e.g., hidden from clients) within the first volume so that snapshots of the first volume may capture the metadata file, and thus may capture the consistency group configuration so that the consistency group configuration may be replicated to the second storage controller and/or the other disaster recovery partner storage controllers using the snapshots. In this way, the storage controllers may be able to easily identify what files and/or LUNs are within the consistency group, and thus within replicated consistency groups maintained as replicated backups of the consistency group. In an example, the consistency group configuration may be updated to reflect the implementation of a move operation, a delete operation, a rename operation, a create operation, or a modification operation associated with configuration of the consistency group.

In an example, the consistency group configuration may be persisted within a cluster wide configuration database (RDB) and/or within a metafile. A cache coherency mechanism may be provided to keep copies of the consistency group configuration in the cluster wide configuration database and the metafile consistent.

At 304, a baseline snapshot of the consistency group may be generated utilizing the consistency group relationship (e.g., the baseline snapshot may capture the first volume or merely the consistency group). The consistency group relationship may be used to identify files and/or LUNs of the consistency group for creation of the baseline snapshot and/or within the baseline snapshot. The baseline snapshot may capture the consistency group configuration, such as the metadata file. At 306, a baseline transfer of data of the consistency group may be performed using the baseline snapshot (e.g., the UUIDs of the consistency group relationship may be used to identify the files and/or LUNs of the consistency group, within the baseline snapshot, for the baseline transfer). The baseline transfer may transfer the data of the consistency group and/or the consistency group configuration into a second volume hosted by the second storage controller to create a replicated consistency group within the second volume. The consistency group relationship may specify that the replicated consistency group of the second volume is a replica/mirror of the consistency group of the first volume (e.g., by virtue of replicated files and/or LUNs of the replicated consistency group having the same UUIDs as corresponding files and/or LUN within the consistency group). In this way, the consistency group configuration may be used to selectively replicate client data of the consistency group of the first volume, but not client data of the first volume that is not within the consistency group. In an example of asynchronous replication, the baseline transfer and periodic incremental transfers may be performed for the consistency group.

Responsive to creating the replicated consistency group, a common snapshot of the second volume may be created. The common snapshot may be tagged as capturing a state of the replicated consistency group that is data consistent (e.g., comprising the same data as) with the consistency group. The common snapshot may be maintained by the second storage controller. The common snapshot may be defined in the context of the consistency group, and thus is a consistency group common snapshot. In an example, a pair of snapshots (e.g., a first snapshot of the first volume and a second snapshot of the second volume) may contain exactly the same user data for the consistency group (e.g., the arbitrary group of LUNs/files that constitute the consistency group) and also contain exactly the same consistency group configuration (e.g., the same set of LUNs/files), and thus may be tagged as a consistency group common snapshot. A first consistency group common snapshot pair is established during a baseline transfer and is used for delta calculations (e.g., identification of potential differences of data of the consistency group not yet replicated from the first volume to the second volume). Each incremental transfer establishes a new consistency group common snapshot pair At 308, a synchronous replication relationship may be specified between the consistency group and the replicated consistency group. One or more incremental transfers of data from the consistency group to the replicated consistency group may be performed (e.g., the baseline transfer and the one or more incremental transfers of the consistency group may be performed before cutting over to synchronous replication). The consistency group relationship may be used to identify files and/or LUNs of the consistency group for replication. In an example of performing an incremental transfer, a current snapshot of the first volume may be compared with a last snapshot of the first volume, used to do a latest transfer of data to the second volume, to identify a delta of the consistency group (e.g., changes to data of the consistency group between when the last snapshot was captured and when the current snapshot was captured). The delta (e.g., new or modified data of the current snapshot) may be transferred to the second storage controller, using an incremental transfer, for updating the replicated consistency group. Responsive to completing the one or more incremental transfers, a synchronous replication engine may be cut over to for synchronously replicating operations, targeting the consistency group, to the replicated consistency group before acknowledging back to clients. For example, an incoming write operation, targeting a file within the consistency group, may be intercepted and split into a replication operation that is sent to the second storage controller for implementation upon a corresponding replicated file within the replicated consistency group. Responsive to completion of the write operation and the replication operation, an acknowledgment may be provided back to a client that sent the write operation to the first storage controller. In this way, synchronous replication may be implemented at a consistency group level of granularity for reducing resources and/or bandwidth otherwise wasted in replicating data not within the consistency group.

At 310, an asynchronous replication relationship may be specified between the consistency group and the replicated consistency group. Accordingly, asynchronous replication may be implemented using snapshots of the first volume, such as snapshots capturing the consistency group. For example, a current snapshot of the first volume may be created. The current snapshot may be compared with a last snapshot, used to mirror data from the first volume to the second volume, to identify a delta of the consistency group between the current snapshot and the last snapshot (e.g., new data and/or changes to the consistency group occurring from when the last snapshot was captured and when the current snapshot was captured). The delta may be mirrored from the first storage controller to the second storage controller for updating the replicated consistency group. In this way, asynchronous replication may be implemented at a consistency group level of granularity for reducing resources and/or bandwidth otherwise wasted in replicating data not within the consistency group.

In an example, the consistency group relationship may be used for switchover operation. For example, a determination may be made that the first storage controller experienced a failure. Accordingly, a switchover may be triggered from the first storage controller to the second storage controller based upon the failure (e.g., ownership of storage devices, such as a storage device comprising the second volume and/or other replicated backup data of the first storage controller, may be changed from the first storage controller to the second storage controller so that the second storage controller can provide clients with failover access to replicated data within such storage devices). Responsive to triggering the switchover, the replicated consistency group may be switched from a read only state to a writeable state in terms of client access. The second storage controller may be instructed to provide clients with failover access to the replicated consistency group, in the writeable state, during switchover operation by the second storage controller (e.g., UUIDs within the consistency group relationship may be used to identify replicated files and/or LUNs of the replicated consistency group for providing failover access). In this way, the consistency group relationship may be used for providing write access to replicated files/LUNs of the consistency group during a failure of the first storage controller, such as during a disaster at a storage site comprising the first storage controller.

In an example, the consistency group relationship may be used for switchback operation. For example, a determination may be made that the first storage controller recovered from the failure. A switchback operation may be performed from the second storage controller to the first storage controller (e.g., ownership of the storage devices may be switched back from the second storage controller to the first storage controller). The replicated consistency group may be utilized to resynchronize the consistency group with a current state of the replicated consistency group (e.g., update the consistency group with changes made to the replicated consistency group during the switchover operation while the first storage controller was unavailable due to the failure). A mirroring relationship of data may be reestablished between the consistency group and the replication consistency group utilizing the consistency group configuration. In this way, the consistency group relationship may be used for reestablishing replication after recovery of the first storage controller.

Figure 4A:
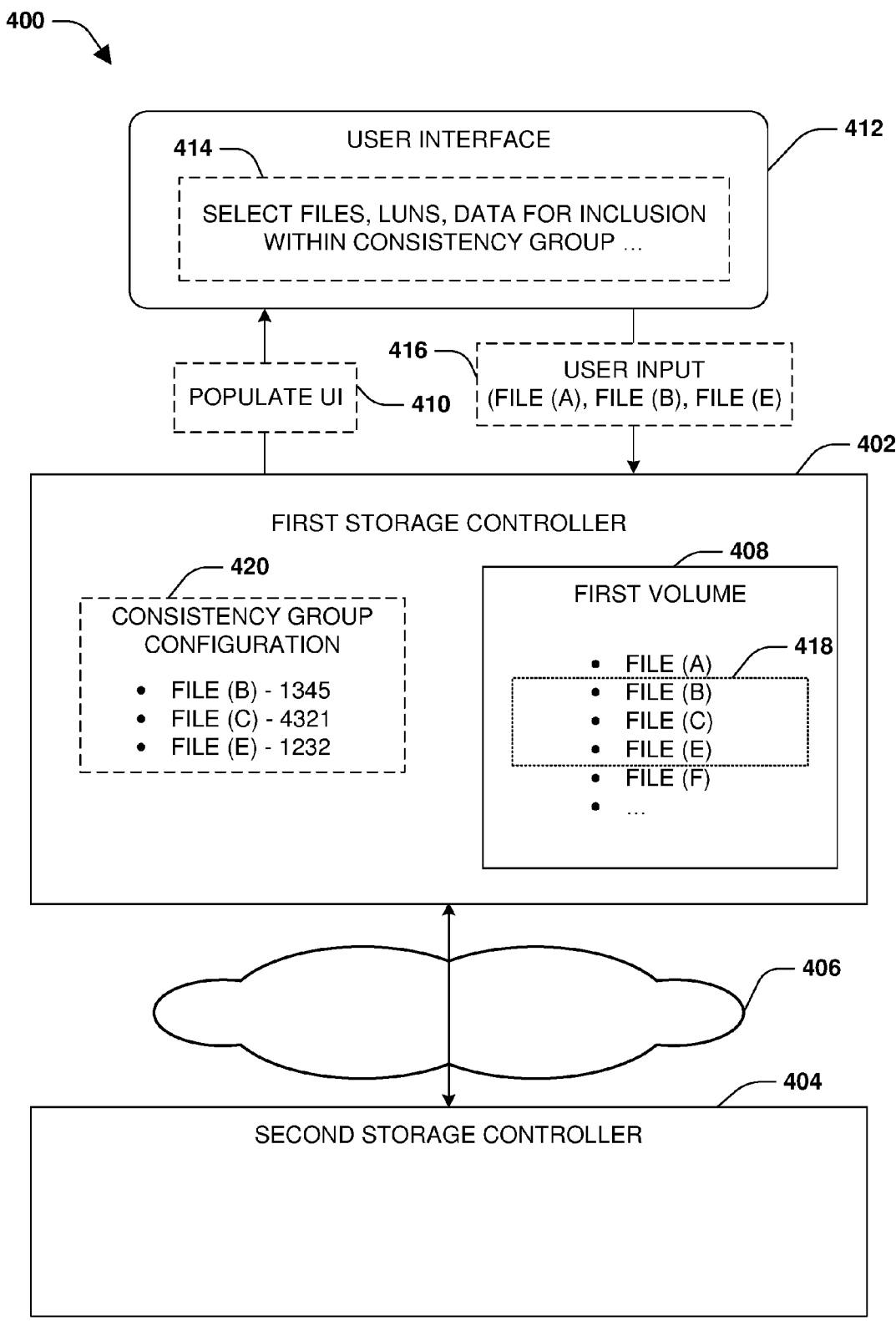
FIG. 4A is a component block diagram illustrating an exemplary computing device for granular replication for data protection, where a user interface is displayed for defining a consistency group.

FIGS. 4A-4I illustrate examples of a system 400 for granular replication for data protection. FIG. 4A illustrates a first storage controller 402 being capable of communicating with a second storage controller 404 over a network 406. The second storage controller 404 may be configured as a disaster recovery partner for the first storage controller 402, such that the second storage controller 404 may provide clients with failover access to replicated data (e.g., data replicated from the first storage controller 402 to the second storage controller 404) in the event the first storage controller 402 fails. The first storage controller 402 may host a first volume 408 comprising a file (A), a file (B), a file (C), a file (E), a file (F), and/or other files, LUNs, directories, and/or storage objects accessible to clients through the first storage controller 402.

A user interface 412 may be displayed to a client. The user interface 412 may be populated 410 with files, LUNs, and/or other data or information of the first volume 408. In this way, the client may select 414 one or more files, LUNs, and/or other data for inclusion within a consistency group 418, which may be received by the first storage controller 402 as user input 416. For example, the user input 416 may select 414 the file (B), the file (C), and the file (E) for inclusion within the consistency group 418. A consistency group configuration 420 may be created. The consistency group configuration 420 may identify the file (B), the file (C), and the file (E) as the consistency group 418 using universal unique identifiers (e.g., numeric identifiers such as 1345 for file (B), 4321 for file (C), and 1232 for file (E); character identifiers; hash identifiers; etc.). In an example, the consistency group configuration 420 may be stored within the first volume 408, such as within a metadata file that is hidden to clients, as illustrated by FIG. 4B.

Figure 4B:
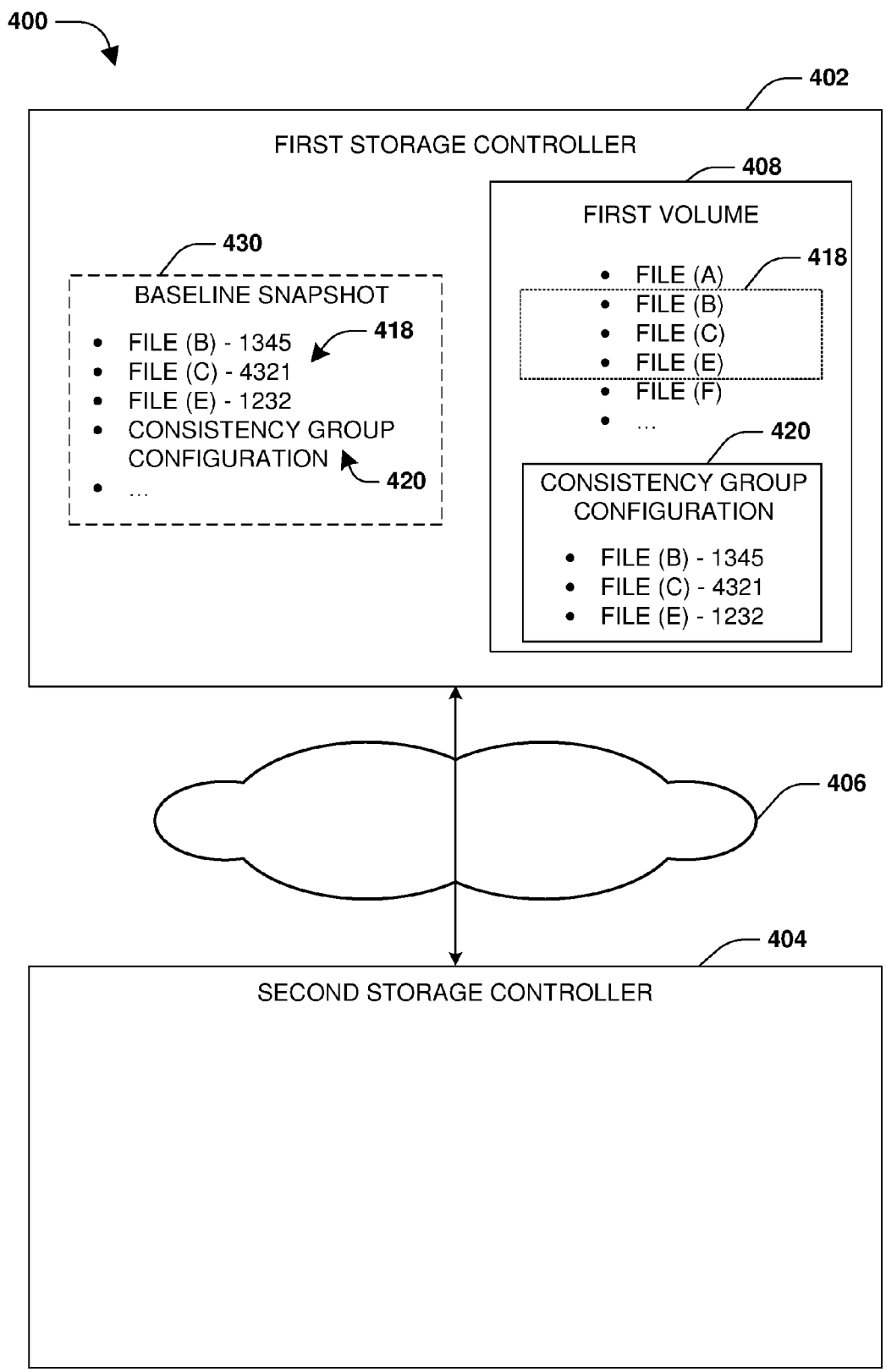
FIG. 4B is a component block diagram illustrating an exemplary computing device for granular replication for data protection, where a baseline snapshot is created.
Figure 4C:
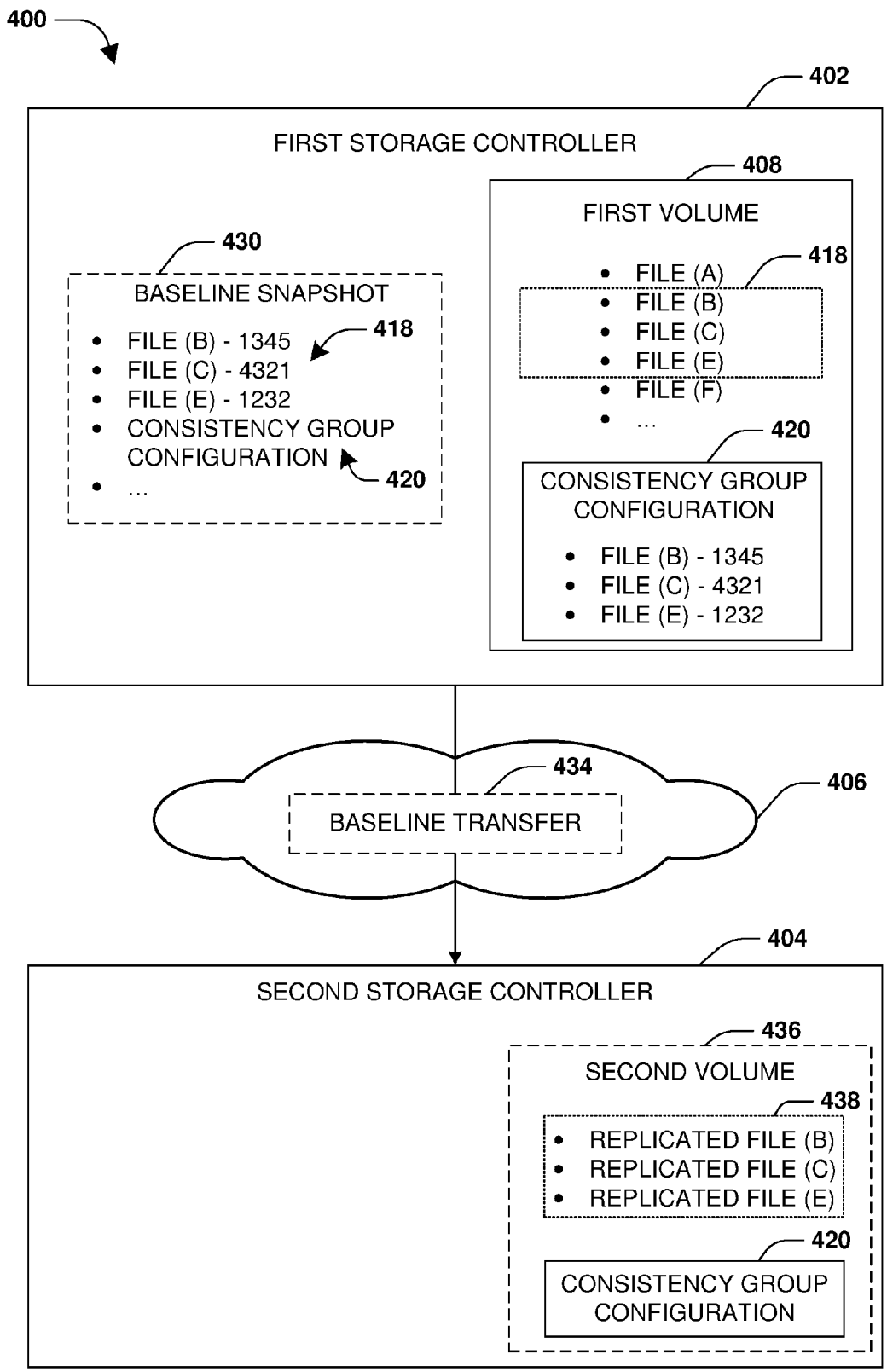
FIG. 4C is a component block diagram illustrating an exemplary computing device for granular replication for data protection, where a baseline transfer is performed.

FIG. 4B illustrates a baseline snapshot 430 being created. The baseline snapshot 430 may capture a point in time representation of the consistency group 418, such as the file (B), the file (C), and the file (E), the consistency group configuration 420, and/or other data of the first volume 408. FIG. 4C illustrates a baseline transfer 434 being performed using the baseline snapshot 430. For example, the baseline transfer 434 may replicate the consistency group configuration 420 into a second volume 436 hosted by the second storage controller 404. The baseline transfer 434 may replicate the consistency group 418 to create a replicated consistency group 438, comprising a replicated file (B), a replicated file (C), and a replicated file (E), within the second volume 436.

Files may be addressed internally within a volume using an inode. A UUID to inode mapping is created in a metafile, which enables continuation of data protection when one or more hops in a cascade data protection relationship may be lost due to failure/disaster. In an example, if there is a relationship A->B->C, then the UUID to inode mapping may enable a data protection relationship between A->C in the event B is lost. For example, the first volume 408 may have a mapping for file (B) as UUID_B->inode 1, the second volume 436 may have a mapping for the replicated file (B) as UUID_B->inode 2, and a third volume may have a mapping of UUID_B->inode 3. The replicated file (B) (e.g., or a replicated LUN (B)) on the second volume 436 may have a different name than on the first volume 408 and/or a different name than on the third volume. Names and inodes can change between volumes, and the UUID is an identifier that can tie them together.

Figure 4D:
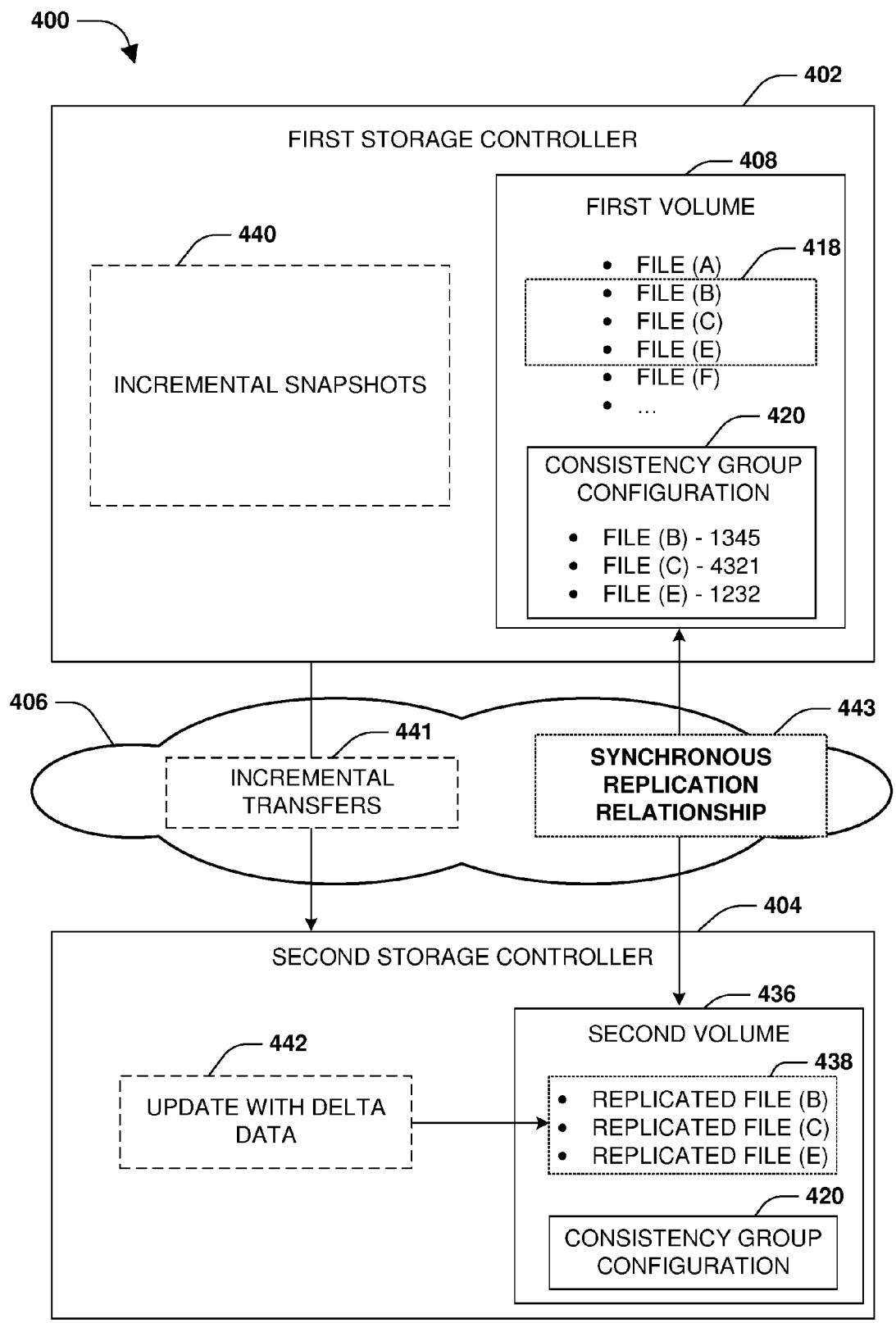
FIG. 4D is a component block diagram illustrating an exemplary computing device for granular replication for data protection, where one or more incremental transfers are performed.

FIG. 4D illustrates the consistency group 418 having a synchronous replication relationship 443 with the replicated consistency group 438. Because the replicated files and/or LUNs within the replicated consistency group 438 may not have the same data as the files and LUNs within the consistency group 418 (e.g., write operations may have be implemented to modify the file (B), the file (C), and/or the file (E) since the baseline transfer 434), one or more incremental transfers 441 may be performed to update the replicated consistency group 438 with data of the consistency group 418. For example, incremental snapshots 440 of the first volume 408 may be created. The consistency group configuration 420, such as the UUIDs, may be used to identify the files and/or LUNs of the consistency group 418 within the incremental snapshots 440. The incremental snapshots 440 may be used to identify changes in data to the consistency group 418 since a prior transfer (e.g., delta data), which may be used to update 442 the replicated consistency group 438 with the delta data.

Figure 4E:
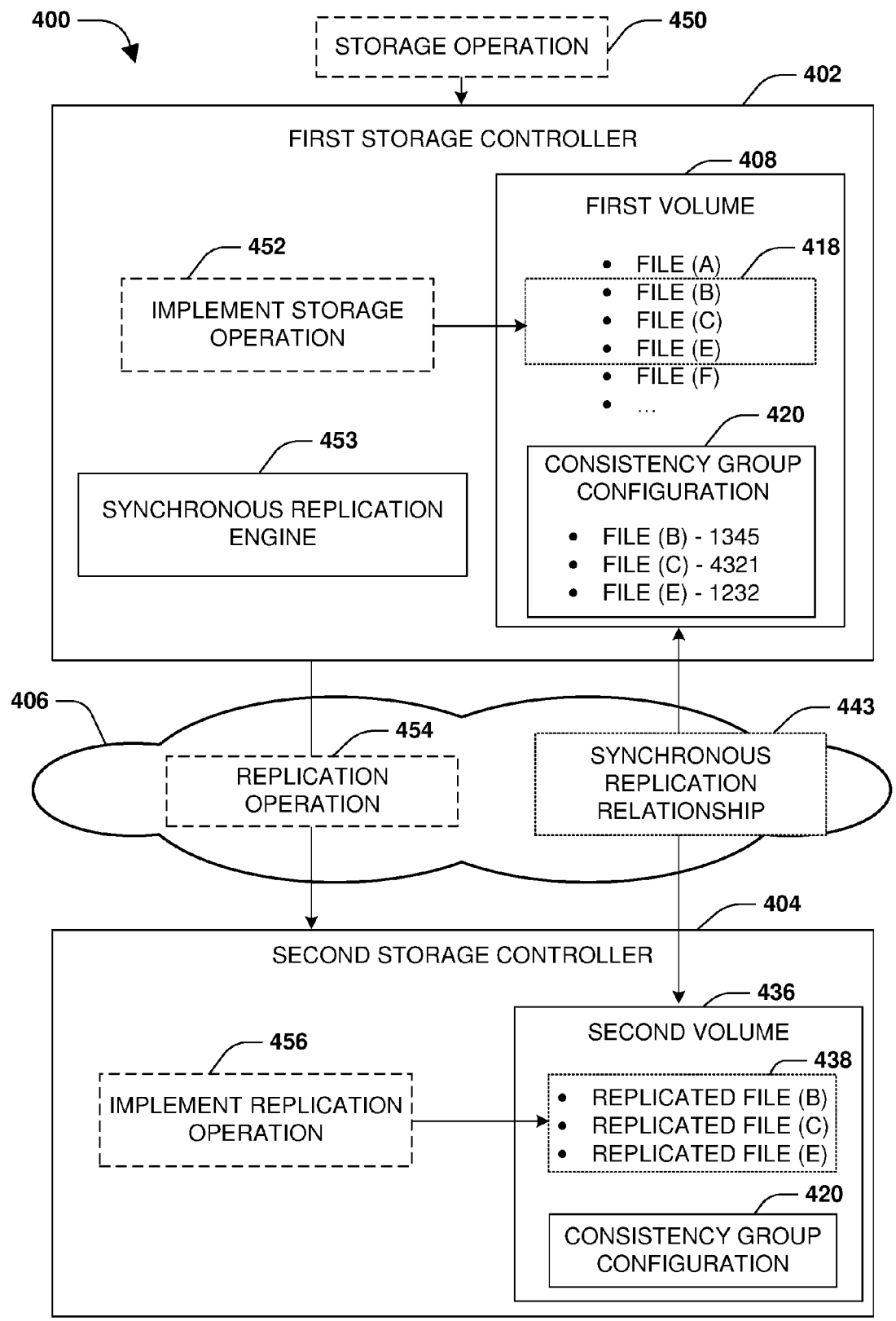
FIG. 4E is a component block diagram illustrating an exemplary computing device for granular replication for data protection, where a synchronous replication engine is implemented.

Responsive to completing the incremental transfers 441, a synchronous replication engine 453 may be cut over to for synchronous replicating operations, targeting the consistency group 418, to the replicated consistency group 438 before acknowledging back to clients, as illustrated in FIG. 4E. For example, a client may send a storage operation 450 (e.g., a write operation, a LUN modification operation, etc.) to the first storage controller 402. The storage operation 450 may be determined as targeting the consistency group 418, such as the file (C), having the synchronous replication relationship 443. Accordingly, the synchronous replication engine 453, such as an interceptor and a splitter, may intercept the storage operation 450 and split the storage operation 450 into a replication operation 454. Accordingly, the storage operation 450 may be locally implemented 452 upon the file (C), and the replication operation 454 may be sent to the second storage controller 404 for remote implementation 456 upon the replicated file (C). Once both the storage operation 450 and the replication operation 454 complete, the first storage controller 402 may send an acknowledgment of success back to the client.

Figure 4F:
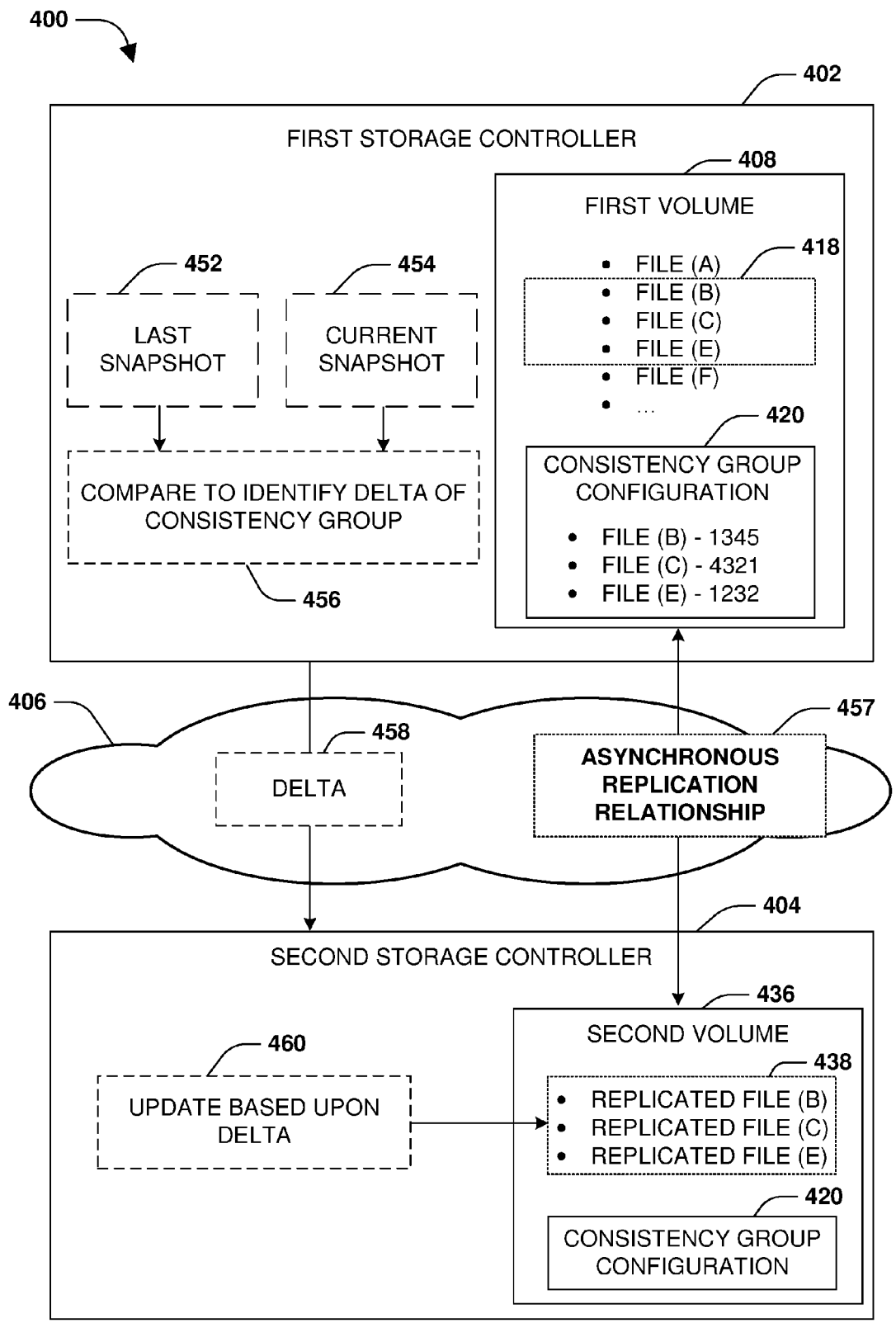
FIG. 4F is a component block diagram illustrating an exemplary computing device for granular replication for data protection, where a delta of a consistency group is used to update a replicated consistency group.

FIG. 4F illustrates the consistency group 418 having an asynchronous replication relationship 457 with the replicated consistency group 438. Accordingly, asynchronous transfers of delta data may be used to update the replicated consistency group 438 with updated data of the consistency group 418. For example, a current snapshot 454 of the first volume 408 may be captured. The current snapshot 454 may be compared 456 with a last snapshot 452, last used to previously mirror data from the first volume 408 to the second volume 436, to identify a delta 458 of the consistency group 418 between the current snapshot 454 and the last snapshot 452 (e.g., differences of the file (B), the file (C), and the file (E) that are captured within the current snapshot 454 but not the last snapshot 452, and thus are not reflected within the replicated consistency group 438 last updated based upon the last snapshot 452). The delta 458 may be sent to the second storage controller 404 for updating 460 the replicated consistency group 438. The consistency group configuration 420 may be used by the first storage controller 402 and/or the second storage controller 404 to identify the consistency group 418 within the snapshots, the first volume 408, and/or the second volume 436.

Figure 4G:
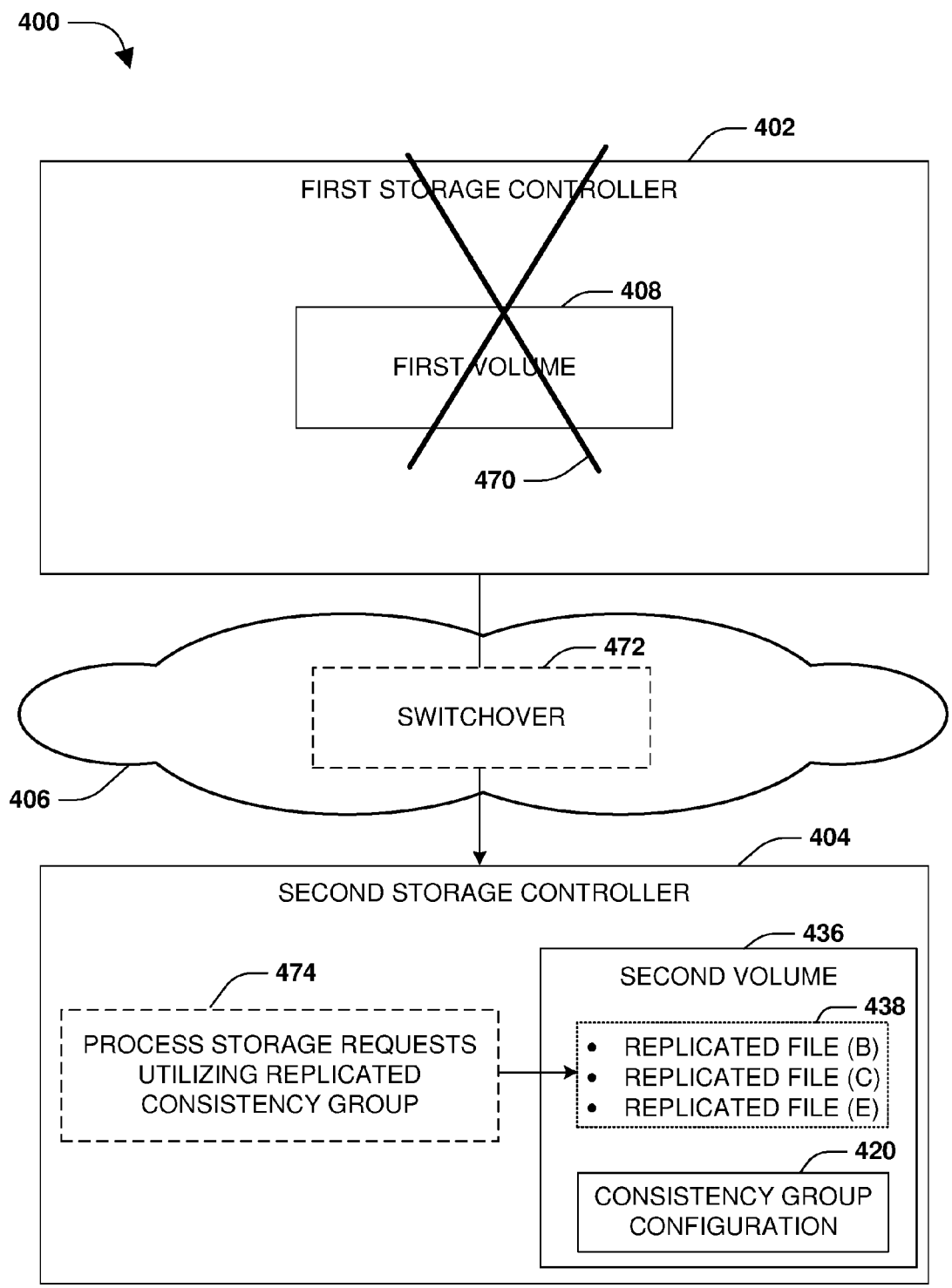
FIG. 4G is a component block diagram illustrating an exemplary computing device for granular replication for data protection, where a switchover is performed.

FIG. 4G illustrates the first storage controller 402 experiencing a failure 470. Accordingly, the second storage controller 404 may perform a switchover 472 to takeover for the first storage controller 402, such as to provide clients with failover access to replicated data within the second volume 436 in place of the first volume 408. For example, the second storage controller 404 may utilize the consistency group configuration 420 to identify the replicated consistency group 438 within the second volume 436. In this way, the second controller 404 may process storage requests utilizing the replicated consistency group 438 while the first storage controller 402 is unavailable due to the failure 470.

Figure 4H:
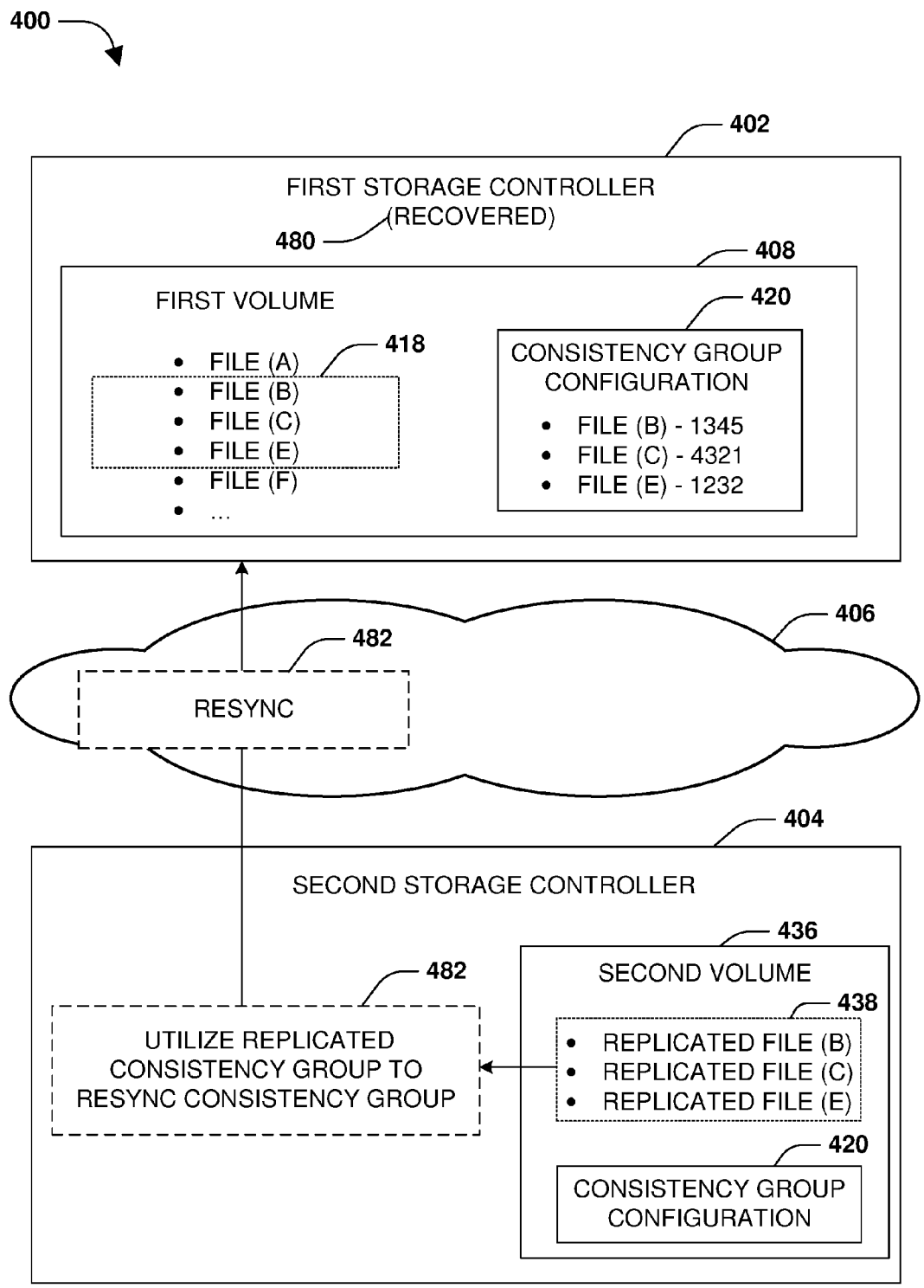
FIG. 4H is a component block diagram illustrating an exemplary computing device for granular replication for data protection, where a switchback is performed.

FIG. 4H illustrates the first storage controller 402 recovering 480 from the failure 470. Accordingly, a switchback operation may be performed to switch back the processing of storage operations from the second storage controller 404 to the first storage controller 402. Because the replicated consistency group 438 may have been modified during the switchover 472 (e.g., a write operation, from a client, may have been processed by the second storage controller 404 upon the replicated file (B) such that the replicated file (B) does not comprise the same data as the file (B) of the consistency group 418), the consistency group configuration 420 may be used to identify the replicated consistency group 438 for resynchronizing 482 the consistency group 418 to a current state of the replicated consistency group 438 (e.g., update the file (B) based upon the write operation performed upon the replicated file (B)). In this way, a mirroring relationship may be reestablished between the consistency group 418 and the replicated consistency group 438.

Figure 4I:
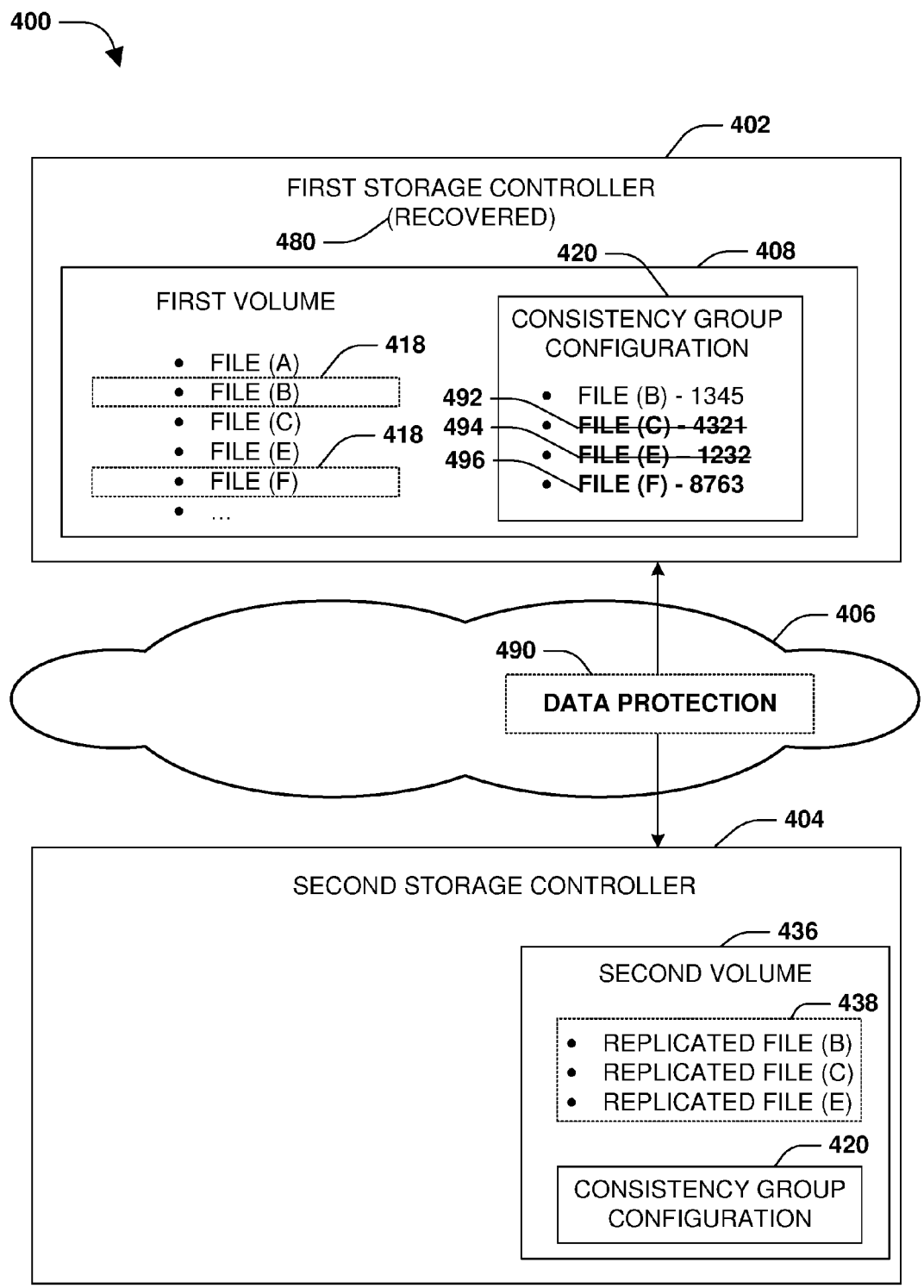
FIG. 4I is a component block diagram illustrating an exemplary computing device for granular replication for data protection, where a consistency group is dynamically expanded or shrunk.

FIG. 4I illustrates the consistency group 418 dynamically expanding or shrinking. For example, files and/or LUNs may be dynamically added to or removed from the consistency group 418, while continued data protection 490 (e.g., backup/restore, replication, disaster recovery, and/or data migration) is provided notwithstanding changes to the consistency group configuration 420. For example, the file (C) and the file (E) may be removed from the consistency group 418, and thus the consistency group configuration 420 may be modified to remove 492 the file (C) and to remove 494 the file (E) as being within the consistency group 418. The file (F) may be added to the consistency group 418, and thus the consistency group configuration 420 may be modified to add 496 the file (F) as being within the consistency group 418.

Figure 5:
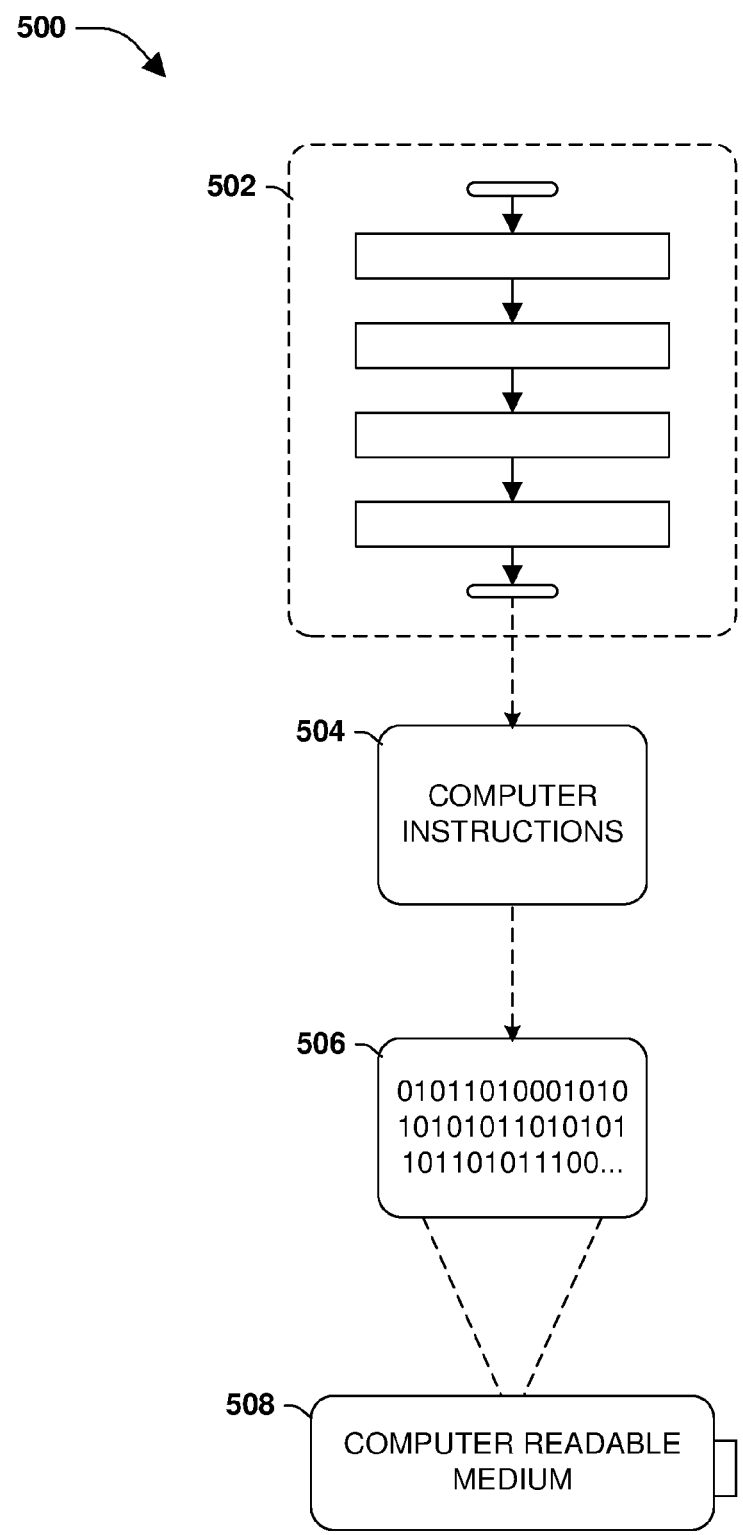
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-ft DVD-R, flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4H, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   maintaining a consistency group relationship for a consistency group created based upon input defining the consistency group as comprising a first subset of a first volume and excluding a second subset of the first volume;
   generating a baseline snapshot of the consistency group utilizing the consistency group relationship;
   performing a baseline transfer of data of the consistency group, using the baseline snapshot, to a second volume to create a replicated consistency group within the second volume as a backup of the consistency group;
   performing incremental transfers of data from the consistency group to the replicated consistency group utilizing the consistency group relationship; and
   transitioning to a synchronous replication state based upon completion of the incremental transfers, wherein incoming write operations targeting the consistency group are split into replication operations that are replicated to the replicated consistency group such that a write operation is acknowledged as complete based upon the write operation and a corresponding replication operation both completing.

2. The method of claim 1, comprising:
   implementing the synchronous replication state by:
      receiving, from a computer over a network, an incoming write operation targeting the consistency group;
      splitting the incoming write operation to create a replication operation;
      executing the incoming write operation upon the consistency group;
      executing the replication operation upon the replicated consistency group; and
      transmitting an acknowledge back to the computer based upon successful execution of both the incoming write operation and the replication write operation.

3. The method of claim 1, comprising:
providing a user interface populated with information regarding files and logical unit numbers within the first volume; and
receiving the input through the user interface, wherein the input specifies target files and logical unit numbers as the first subset of the first volume.

4. The method of claim 1, comprising:
assigning universal unique identifiers (UUIDs) to files and logical unit numbers within the first subset of the first volume, the UUIDs specified within the consistency group configuration.

5. The method of claim 1, wherein the baseline transfer and the incremental transfers utilize granular replication to selectively replicate client data within the first subset and not replicate client data within the second subset.

6. The method of claim 1, comprising:
storing the consistency group configuration within a metadata file within the first volume, the metadata file hidden from clients.

7. The method of claim 1, wherein the baseline snapshot comprises the metadata file.

8. The method of claim 1, comprising:
creating a common snapshot of the second volume, the common snapshot capturing a state of the replicated consistency group that is data consistent with the consistency group.

9. The method of claim 1, wherein a first storage controller hosts the first volume and a second storage controller hosts the second volume, the method comprising:
determining that the first storage controller experienced a failure;
triggering a switchover from the first storage controller to the second storage controller based upon the failure;
switching the replicated consistency group from a read only state to a writeable state; and
instructing the second storage controller to provide clients with failover access to the replicated consistency group, in the writeable state, during switchover operation by the second storage controller.

10. The method of claim 9, comprising:
determining that the first storage controller recovered from the failure;
performing a switchback operation from the second storage controller to the first storage controller; and
utilizing the replicated consistency group to resynchronize the consistency group with a current state of the replicated consistency group.

11. The method of claim 10, the utilizing the replicated consistency group comprising:
reestablishing a mirroring relationship between the consistency group and the replicated consistency group.

12. The method of claim 1, comprising:
updating the consistency group configuration based upon a modification operation associated with data of the consistency group.

13. The method of claim 1, wherein the first subset of the first volume corresponds to a virtual machine.

14. A non-transitory machine readable medium having stored thereon instructions which when executed by machine, causes the machine to:
maintain a consistency group relationship for a consistency group created based upon input defining the consistency group as comprising a first subset of a first volume and excluding a second subset of the first volume;
generate a baseline snapshot of the consistency group utilizing the consistency group relationship;
perform a baseline transfer of data of the consistency group, using the baseline snapshot, to a second volume to create a replicated consistency group within the second volume as a backup of the consistency group;
perform incremental transfers of data from the consistency group to the replicated consistency group utilizing the consistency group relationship; and
transition to a synchronous replication state based upon completion of the incremental transfers, wherein incoming write operations targeting the consistency group are split into replication operations that are replicated to the replicated consistency group such that a write operation is acknowledged as complete based upon the write operation and a corresponding replication operation both completing.

15. The non-transitory machine readable medium of claim 14, wherein the instructions cause the machine to:
assign universal unique identifiers (UUIDs) to files and logical unit numbers within the first subset of the first volume, the UUIDs specified within the consistency group configuration.

16. The non-transitory machine readable medium of claim 14, wherein a first storage controller hosts the first volume and a second storage controller hosts the second volume, wherein the instructions cause the machine to:
determine that the first storage controller experienced a failure;
trigger a switchover from the first storage controller to the second storage controller based upon the failure;
switch the replicated consistency group from a read only state to a writeable state; and
instruct the second storage controller to provide clients with failover access to the replicated consistency group, in the writeable state, during switchover operation by the second storage controller.

17. The non-transitory machine readable medium of claim 16, wherein the instructions cause the machine to:
determine that the first storage controller recovered from the failure;
perform a switchback operation from the second storage controller to the first storage controller; and
utilize the replicated consistency group to resynchronize the consistency group with a current state of the replicated consistency group.

18. The non-transitory machine readable medium of claim 14, wherein the instructions cause the machine to:
provide a user interface populated with information regarding files and logical unit numbers within the first volume; and
receive the input through the user interface, wherein the input specifies target files and logical unit numbers as the first subset of the first volume.

19. The non-transitory machine readable medium of claim 14, wherein the instructions cause the machine to:
store the consistency group configuration within a metadata file within the first volume, the metadata file hidden from clients.

20. A computing device comprising:
a memory containing machine readable medium comprising machine executable code having stored thereon instructions for performing a method of granular replication for data protection; and
a processor coupled to the memory, the processor configured to execute the machine executable code to cause the processor to:

maintain a consistency group relationship for a consistency group created based upon input defining the consistency group as comprising a first subset of a first volume and excluding a second subset of the first volume;
generate a baseline snapshot of the consistency group utilizing the consistency group relationship;
perform a baseline transfer of data of the consistency group, using the baseline snapshot, to a second volume to create a replicated consistency group within the second volume as a backup of the consistency group;
perform incremental transfers of data from the consistency group to the replicated consistency group utilizing the consistency group relationship; and
transition to a synchronous replication state based upon completion of the incremental transfers, wherein incoming write operations targeting the consistency group are split into replication operations that are replicated to the replicated consistency group such that a write operation is acknowledged as complete based upon the write operation and a corresponding replication operation both completing.

* * * * *